Patented Aug. 23, 1932

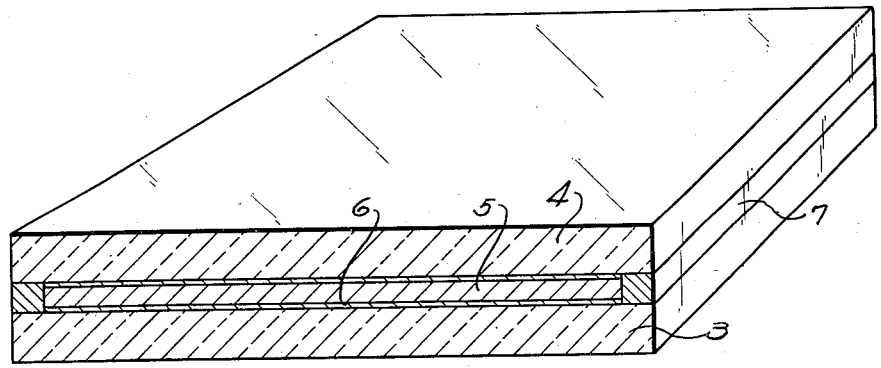
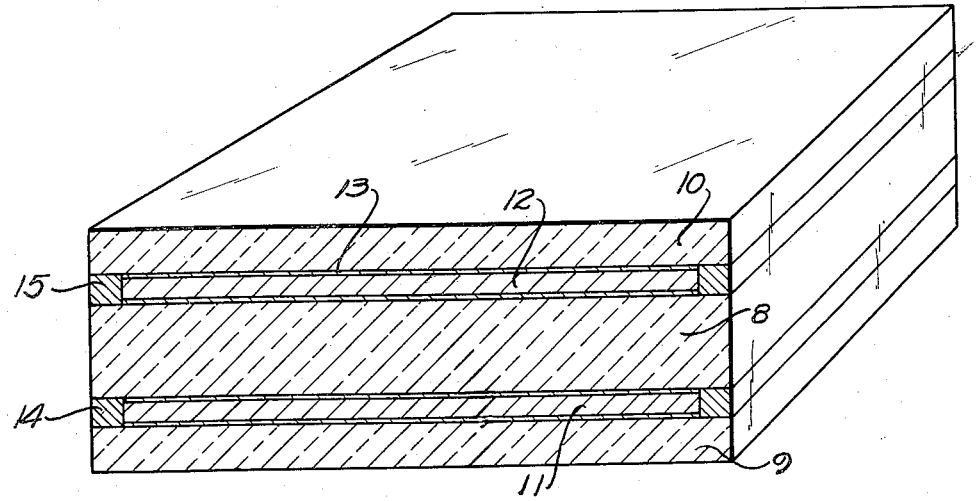

1,873,691

UNITED STATES PATENT OFFICE

GEORGE B. WATKINS, OF TOLEDO, OHIO, ASSIGNOR TO THE LIBBEY-OWENS-FORD GLASS COMPANY, OF TOLEDO, OHIO, A CORPORATION OF OHIO

LAMINATED GLASS

Application filed March 3, 1928. Serial No. 258,746.

The present invention relates to a new article of manufacture, namely, a sheet of laminated glass and to the process of producing the same.

An important object of the invention is to provide a process for producing, as a new article of manufacture, a sheet of laminated glass wherein a skin of gelatin is formed on one side each of two sheets of glass, the gelatin containing a mixture of water and a preferably high boiling point solvent miscible with the water, said solvent being a solvent for a cellulose composition material, the process including the interposing of a sheet of cellulose composition material between the gelatin coated surfaces of the glass sheets, after which the laminations are bonded together.

Another object of the invention is to provide such a process wherein a mixture of gelatin and water containing a preferably high boiling point solvent miscible with the water is made, the said mixture being formed into a skin on one side each of two she ts of glass, after which a sheet of cellulose composition material is interposed between the gelatin skins and united thereto, the solvent acting to retain the proper amount of water in the gelatin skin and to also act as a solvent for the cellulose composition sheet whereby to obtain a better bond between the sheet and the gelatin skins.

Other objects and advantages of the invention will become more apparent during the course of the following description when taken in connection with the accompanying drawing.

In the drawing wherein like numerals are employed to designate like parts throughout the same, Fig. 1 is a diagrammatic perspective view, partially in section, of one form of laminated sheet produced in accordance with the present invention, and Fig. 2 is a similar view of another form of commercial product.

The present invention relates to laminated glass bonded together by means of a gelatin adhesive. In the past some commercial laminated glass has been produced by joining together two or more sheets of glass and one or more sheets of non-brittle material by the aid of gelatin. The gelatin ordinarily contains a relatively high percentage of water, and in the production of laminated glass with the above mentioned process it has been customary in some forms to form a skin or coating of gelatin on one surface each of two sheets of glass. After the skins have been formed the glass sheets are joined or bonded to a non-brittle sheet.

In accordance with the present invention, the gelatin skins differ from the prior gelatin skins. To produce my improved gelatin skins, the gelatin is mixed with a mixture of water and a solvent. A preferably high boiling point solvent is used and one which is miscible with the water. A further desirable characteristic is that the solvent be a solvent for a cellulose composition material. As an example of such a solvent, I mention diethylene glycol, although it is to be clearly understood that this invention is not limited to the use of diethylene glycol. On the other hand, the invention broadly contemplates the use of any solvent miscible with water and having a solvent action on the non-brittle sheet used.

Referring to Fig. 1, the numerals 3 and 4 designate two sheets of preferably transparent glass whose surfaces may be ground and polished, or not, as desired. Interposed between the glass sheets is a sheet of non-brittle material 5, and I prefer to use a transparent sheet of cellulose composition material, for instance, cellulose nitrate, cellulose acetate, cellulose hydrate, etc. or a sheet of cellulose ether may be used. The numeral 6 designates a gelatin adhesive used to bond the sheets 3, 4, and 5 together.

To form the adhesive, gelatin is mixed with water and a solvent. It is preferred that a high boiling point solvent be used and that the solvent be miscible with the water and of such a nature that it will have a solvent action on the cellulose composition sheet. For this purpose, diethylene glycol or similar solvents may be used. By using a mixture of water and a solvent miscible with the water in the gelatin adhesive, the solvent will act to retain the proper amount of water in the gelatin which is a desirable condition.

In one form of the invention the gelatin solution thus made can be sprayed or otherwise applied to one side each of two sheets of glass. In some instances it may be desirable to evaporate some of the water and solvent from the coating, whereby to produce a skin or coating of the desired properties and containing the proper amount of liquid. The cellulose sheet 5 may then be arranged between the glass sheets 3 and 4, and the sandwich thus produced subjected to the combined action of heat and pressure. Due to the solvent action of the solvent upon the cellulose composition sheet, the surface of the cellulose composition sheet will be softened and a more intimate bond obtained between the laminations.

Another way of forming the laminated sheet is to form the gelatin skin on the glass sheets and then spread a film of water and solvent on the surface of the gelatin skin, or the solution of water and solvent can be applied to the surface of the cellulose sheet 5.

To protect the bond between the laminations from the atmosphere, etc., it is preferred that a seal 7 be used, and this seal may be formed from any suitable material capable of protecting the bond between the laminations.

In Fig. 2 is represented a different type of laminated sheet wherein a relatively heavy central sheet 8 and two outer sheets 9 and 10 are used. Arranged between the glass sheets are the non-brittle membranes 11 and 12. The adhesive above mentioned and designated by the numeral 13 in Fig. 2, may be used to obtain the bond between the laminations. In this type of sheet, it is necessary to use two seals 14 and 15.

It is to be understood that the form of the invention herewith shown and described is to be taken as the preferred embodiment of the same, and that various changes in the shape, size and arrangement of parts may be resorted to without departing from the spirit of the invention or the scope of the subjoined claims.

I claim:

1. As a new article of manufacture, a sheet of laminated glass including a skin of gelatin containing diethylene glycol.

2. As a new article of manufacture, a sheet of laminated glass comprising two sheets of glass, an interposed layer of cellulose ester, and a bonding agent therefor including gelatin and a polyglycol.

3. As a new article of manufacture, a sheet of laminated glass comprising two sheets of glass, an interposed layer of cellulose ester, and a bonding agent therefor comprising gelatin, water, and a polyglycol.

4. The process of producing laminated glass consisting in making a mixture of gelatin, water, and a polyglycol, applying a film thereof to one surface each of two sheets of glass, then arranging a sheet of cellulose ester between the coated surfaces of the glass sheets, and applying heat and pressure to the sandwich thus formed to produce a composite structure.

5. As a new article of manufacture, a sheet of laminated glass comprising two sheets of glass, an interposed layer of cellulose ester, and a bonding agent therefor including gelatin and diethylene glycol.

Signed at Toledo, in the county of Lucas and State of Ohio, this 25th day of February, 1928.

GEORGE B. WATKINS.